United States Patent
Simon et al.

(10) Patent No.: US 12,416,248 B2
(45) Date of Patent: Sep. 16, 2025

(54) SLEEVE MOUNTED ONTO A LOW-PRESSURE SHAFT IN A TURBOMACHINE

(71) Applicant: SAFRAN AIRCRAFT ENGINES, Paris (FR)

(72) Inventors: Vianney Simon, Moissy-Cramayel (FR); Patrice Jean-Marc Rosset, Moissy-Cramayel (FR); Patrick Jean Laurent Sultana, Moissy-Cramayel (FR); Jean-Claude Christian Taillant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/580,890

(22) PCT Filed: Jul. 20, 2022

(86) PCT No.: PCT/FR2022/051438
§ 371 (c)(1),
(2) Date: Jan. 19, 2024

(87) PCT Pub. No.: WO2023/002121
PCT Pub. Date: Jan. 26, 2023

(65) Prior Publication Data
US 2024/0337201 A1    Oct. 10, 2024

(30) Foreign Application Priority Data

Jul. 22, 2021   (FR) .................................... 2107949

(51) Int. Cl.
*F01D 25/18*   (2006.01)
*F02C 7/36*    (2006.01)

(52) U.S. Cl.
CPC .............. *F01D 25/183* (2013.01); *F02C 7/36* (2013.01); *F05D 2260/31* (2013.01)

(58) Field of Classification Search
CPC ........ F01D 25/16; F01D 25/162; F01D 25/18; F01D 25/183; B64C 11/00–44
See application file for complete search history.

(56) References Cited

U.S. PATENT DOCUMENTS 2,681,837 A * 6/1954 Boyd ..................... F16C 33/80
                                              384/466
2,968,922 A * 1/1961 Gilbert .................... F02C 7/20
                                              475/346

(Continued)

FOREIGN PATENT DOCUMENTS

CN    114542205 A  *  5/2022  ............. F01D 25/08
EP    2 050 932 A2    4/2009

(Continued)

*Primary Examiner* — Topaz L. Elliott
(74) *Attorney, Agent, or Firm* — BIRCH, STEWART, KOLASCH & BIRCH, LLP

(57) ABSTRACT

The present invention relates to a rotating assembly of a turbomachine, comprising: —a shaft configured to drive a propeller of the turbo machine around an axis and comprising a first flange radially extending from the shaft, the first flange being monolithic with the shaft; —a sleeve fitted onto the shaft and comprising a second flange radially extending from the sleeve, the sleeve being attached to the first flange of the shaft by means of the second flange; and —at least one component connected to the shaft by means of the sleeve so as to be rigidly connected to the shaft to move therewith, the component comprising at least one sealing element.

25 Claims, 2 Drawing Sheets

(56) References Cited

U.S. PATENT DOCUMENTS

| | | | | |
|---|---|---|---|---|
| 3,057,542 | A | * 10/1962 | Keenan | F01D 25/18 |
| | | | | 384/317 |
| 3,158,413 | A | 11/1964 | Shelley | |
| 4,463,956 | A | * 8/1984 | Malott | F02C 7/28 |
| | | | | 415/230 |
| 2014/0010648 | A1 | * 1/2014 | Muldoon | F01D 25/16 |
| | | | | 415/230 |
| 2018/0266276 | A1 | * 9/2018 | Phillips | F01D 25/164 |
| 2019/0093508 | A1 | 3/2019 | Patsouris et al. | |

FOREIGN PATENT DOCUMENTS

| | | | |
|---|---|---|---|
| EP | 2 050 932 A3 | 6/2012 | |
| EP | 3 018 302 A1 | 5/2016 | |
| GB | 826568 A | * 1/1960 | |

* cited by examiner

SLEEVE MOUNTED ONTO A LOW-PRESSURE SHAFT IN A TURBOMACHINE

TECHNICAL FIELD

The present disclosure relates to the field of aeronautical propulsion systems and finds in particular an application in the propulsion systems having a high bypass ratio.

BACKGROUND

In a manner known per se, a turbomachine comprises bearings configured to support a mobile part relative to a fixed part (or stator) of the turbomachine or relative to another mobile part. These bearings can in particular comprise an inner ring mounted on a mobile element, for example a shaft, and an outer ring mounted on another part of the turbomachine. The inner ring can be particularly mounted on the low-pressure shaft using threaded nuts. The shaft then comprises complementary threads allowing the nut to be fixed and tightened against the inner ring. Sealing elements such as knife-edges can also be provided on the shaft. These sealing elements can be particularly monolithic with the low-pressure shaft.

The mounting and machining of these different components however requires specific machining such as making threads or sealing elements which, in addition to raising technical difficulties in terms of machining, form privileged areas of damage of the shaft, creating areas of weakness and/or areas of stress concentration. Depending on the materials chosen for the shaft and the knife-edge-type sealing elements, there may also be increased risks of corrosion, in particular at the top of the knife-edges due to friction, this area cannot be protected.

The maintenance operations are further complex, particularly when the worn or damaged areas touch the shaft.

These risks are all the more significant in the case of supercritical and fast low-pressure shafts, for example in the turbomachines whose fan is unducted.

SUMMARY

One aim is to overcome the aforementioned drawbacks, by proposing a low-pressure turbomachine shaft that is simpler to make, has an increased service life and whose maintenance is facilitated.

For this purpose, according to a first aspect, a rotating assembly in accordance with claim 1 is proposed. Embodiments of the rotating assembly are defined in the dependent claims.

According to a second aspect, a rotating assembly is proposed comprising:
- a shaft configured to drive a propeller of the turbomachine about an axis and comprising a first flange extending radially from the shaft, the first flange being monolithic with the shaft;
- a sleeve fitted onto the shaft and comprising a second flange extending radially from the sleeve, the sleeve being fixed onto the first flange of the shaft via the second flange; and
- at least one component connected to the shaft via the sleeve so as to be secured in movement to the shaft, the component comprising at least one sealing element.

Some preferred but non-limiting characteristics of the rotating assembly according to the second aspect are as follows, taken individually or in combination:

the second flange is monolithic with the sleeve;
the rotating assembly further comprises a fixing member mounted on the sleeve, the at least one component being tightly mounted on the sleeve via the fixing member;
the sleeve further comprises a shoulder extending at a distance from the second flange and the at least one component is tightly mounted between the fixing member and the shoulder;
the at least one component is removably mounted on the sleeve and further comprises the at least one of the following elements: a ring of a bearing; and a scoop connected to a lubrication system.
the component comprises two sealing elements delimiting an enclosure, an inner ring of a bearing housed in the enclosure and a scoop, the scoop comprising an open orifice on the enclosure and a lubrication fluid supply channel fluidly connecting the orifice to the bearing in order to supply the bearing with lubrication fluid;
the first flange is further connected to an additional component of the turbomachine, the additional component comprising at least one sealing element, the sealing element preferably comprising a sealing knife-edge;
the first flange is further connected to an additional component of the turbomachine, the additional component comprising an additional flange extending radially from the fixing member; and/or
the fixing member is radially outside relative to the sleeve.

According to a third aspect, it is proposed a turbomachine comprising a rotating assembly according to the first or the second aspect. The turbomachine can further comprise an unducted propeller driven in rotation by the shaft. In one embodiment, the turbomachine has a bypass ratio greater than 30.

According to a fourth aspect, the invention proposed an aircraft comprising at least one turbomachine according to the third aspect.

DESCRIPTION OF THE FIGURES

Other characteristics, aims and advantages will emerge from the following description, which is purely illustrative and not limiting, and which should be read in relation to the appended drawings in which.

In all the figures, similar elements bear identical references.

DETAILED DESCRIPTION

Figure 1:
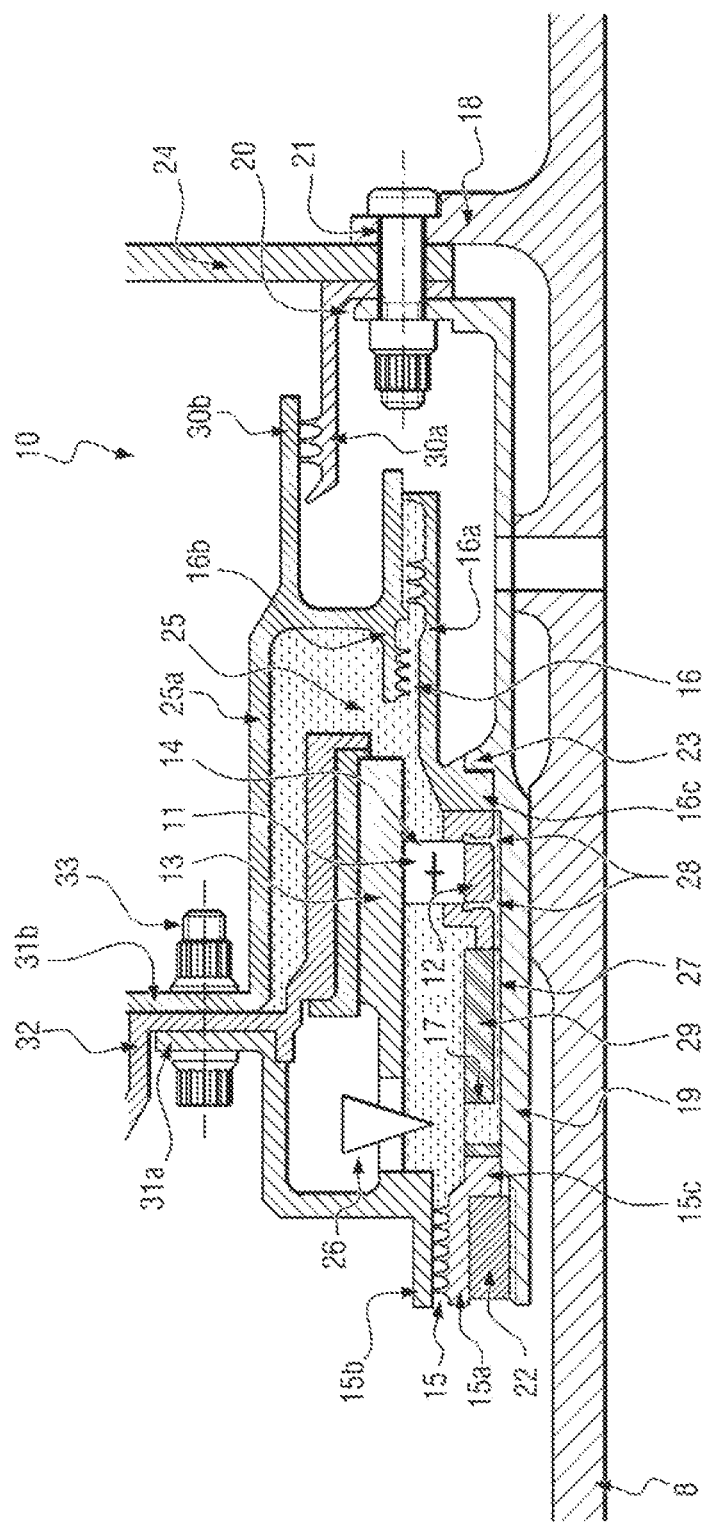
FIG. 1 schematically illustrates an example of a rotating assembly in accordance with one embodiment.
Figure 2:
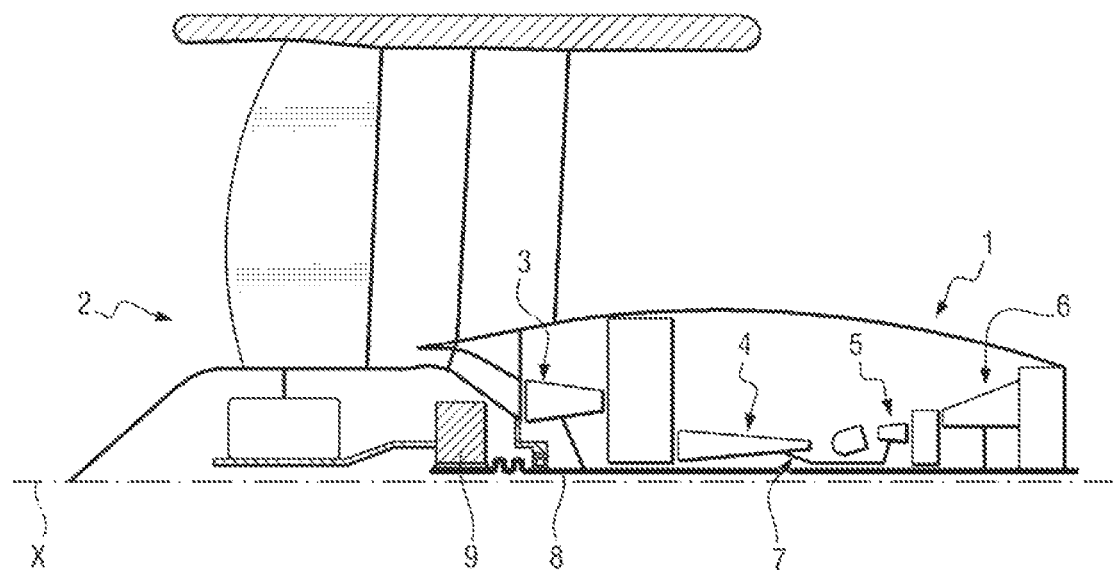
FIG. 2 is a partial schematic view of one example of a turbomachine which can comprise a rotating assembly in accordance with an embodiment.
Figure 3:
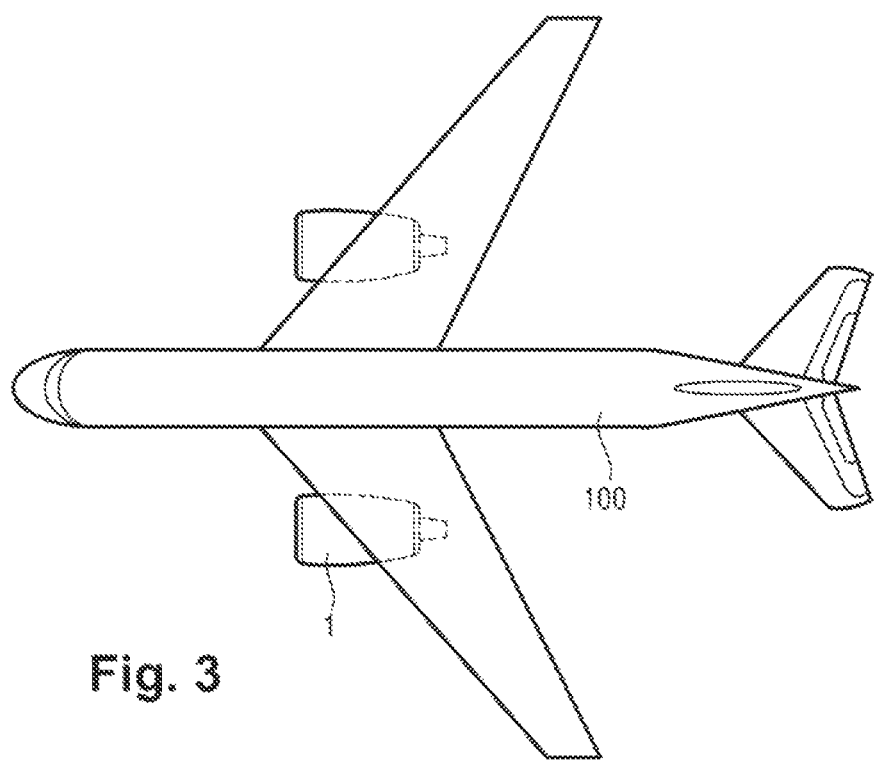
FIG. 3 schematically illustrates an aircraft comprising two turbomachines in accordance with one embodiment.

A turbofan engine 1, in particular of an aircraft 100, generally comprises, from upstream to downstream in the gas flow direction, a fan 2 (or propeller), an annular primary flow space and a annular secondary flow space which is externally relative to the primary flow. The mass of air sucked in by the fan 2 is therefore divided into a primary stream which circulates in a primary flowpath, and a secondary stream which is concentric with the primary stream and circulates in a secondary flowpath. The fan 2 (or propeller) can be ducted and housed in a fan 2 casing or in an unducted variant of the USF (Unducted Single Fan 2) type. The fan blades 2 can be fixed or have variable setting, the setting being adjusted according to the flight phases by a pitch change mechanism.

The primary flowpath passes through a primary body comprising one or several stages of compressors, for example a low-pressure compressor 3 (or booster) and a high-pressure compressor 4, a combustion chamber, one or several stages of turbines, for example a high-pressure turbine 5 and a low-pressure turbine 6, and a gas exhaust nozzle. Typically, the high-pressure turbine 5 drives in rotation the high-pressure compressor 4 via a first shaft 7 called high-pressure shaft, while the low-pressure turbine 6 drives in rotation the low-pressure compressor 3 and the fan 2 via a second shaft 8 called low-pressure shaft. The low-pressure shaft 8 is generally housed on a certain section in the high-pressure shaft 7.

Several components 11, 15, 29 of the turbomachine 1 can be removably mounted on the low-pressure shaft 8 in order to be driven in rotation about the axis of revolution of the low-pressure shaft 8. These components 11, 15, 29 comprise in particular one or several bearings 11, sealing elements 15, 16, 30 and/or one or several scoops 29.

As described above, a bearing 11 is configured to support a mobile part relative to a fixed part (or stator) of the turbomachine 1 or relative to another mobile part. The bearing 11 comprises in particular an inner ring 12 secured in movement to the low-pressure shaft 8, an outer ring 13 mounted on another part of the turbomachine 1, the inner ring 12 and the outer ring 13 housing for example a rolling 14. The inner ring 12 and the outer ring 13 are mobile relative to each other.

The sealing element 15 is configured to achieve a sealing between two pieces and can comprise for example a labyrinth seal which has at least two axially adjacent clearance restrictions. The clearance restrictions can for example comprise at least two knife-edges and/or a twist which winds on at least two turns. The labyrinth seal can thus comprise a support secured in movement to the low-pressure shaft 8 and the clearance restrictions configured to cooperate with a complementary sealing piece mounted on a facing piece, for example an abradable element. It will be noted that the sealing element 15 can comprise any other type of seal, such as a segmented radial seal, a brush seal, a carbon seal, etc.

The scoop 29 can be part of a lubrication system of the rotating assembly 1 and be configured to supply pieces with lubrication fluid.

In order to facilitate the manufacture and maintenance of the low-pressure shaft 8 and to improve its service life, all or part of the components 11, 15, 16, 29 driven in rotation by the low-pressure shaft 8 are connected to the shaft via a sleeve 19 fitted onto the low-pressure shaft 8. For this purpose, the low-pressure shaft 8 comprises a first flange 18 extending radially from an outer radial surface of the shaft. Moreover, the sleeve 19 comprises a second flange 20 extending radially from the sleeve 19 and configured to cooperate with the first flange 18 in order to allow the sleeve 19 to be fixed on the low-pressure shaft 8. The sleeve 19 is then secured in movement (in rotation and in translation) to the low-pressure shaft. The components 11, 15, 17, 29 are then mounted on or formed in the sleeve 19 and driven by the low-pressure shaft 8 via the sleeve 19. Particularly, the components 11, 15 and 29 are not directly mounted on the low-pressure shaft 8 and are preferably not in direct contact with the low-pressure shaft 8.

The first flange 18 is monolithic with the low-pressure shaft 8 in order to limit the machining needs of the shaft. The second flange 20 can be monolithic with the sleeve 19 or added and fixed onto the sleeve 19. The sleeve 19 and the low-pressure shaft 8 form a rotating assembly 10. The first flange 18 and the second flange 20 extend here radially outwards relative to the rotation shaft X of the low-pressure shaft 8.

Removably fixing the components 11, 15, 29 on the sleeve 19, rather than on the low-pressure shaft 8, makes it possible to limit the machining of the low-pressure shaft 8 which improves its service life. It is further simpler and less expensive to replace or repair worn or damaged components 11, 15, 29, since it suffices to dismount the components 11, 15 and/or the sleeve 19 in order to replace them. Fixing the sleeve 19 via a flange rather than any other connection means also avoids making threads prone to damage during the operation of the turbomachine 1, and can be made with greater manufacturing and alignment tolerance.

The rotating assembly 10 further comprises a lubrication enclosure 25 comprising a wall 25*a* fixedly mounted on a stator of the turbomachine, for example a casing of the turbomachine. The bearing 11 is housed in the lubrication enclosure 25. The inner ring 12 is added and fixed onto the sleeve 19 and secured in rotation to the sleeve 19, and an outer ring 13 fixedly mounted relative to the wall 25*a* of the lubrication enclosure 25.

The enclosure 25 is delimited on either side by sealing elements 15, 16 comprising clearance restrictions. Advantageously, the use of clearance restrictions such as knife-edges or twists rather than cylindrical seals improves the sealing of the enclosure 25, the sealing being achieved over a greater axial length. In addition, possible damage to one of the clearance restrictions is compensated by the presence of the other clearance restrictions of the sealing element 15, 16 extending immediately downstream, so that the sealing of the enclosure 25 is more robust. However, in the case of high bypass ratio turbomachines 1, the rotation speed of the low-pressure shaft 8 is very high (the low-pressure turbine being a fast turbine), so that it is necessary to guarantee the sealing of the enclosure 25 housing the bearings 11 mounted on the low-pressure shaft 8).

A first 15 of the sealing elements comprises a first part 15*a* added and fixed onto the sleeve 19 while being secured in movement to the sleeve 19 and a second part 15*b* fixedly mounted relative to the wall 25*a* of the enclosure 25. A second 16 of the sealing elements comprises a first part 16*a* fixedly mounted on the sleeve 19 while being secured in movement to the sleeve 19 and a second part 16*b* fixedly mounted relative to the wall 25*a* of the enclosure 25. In the exemplary embodiment of FIG. 1, the first part 16*a* is added and fixed onto the sleeve 19. As a variant, the first part 16 can be monolithic with the sleeve 19.

The bearing 11 is placed between the first and the second sealing element 15, 16.

The sleeve 19 further comprises a shoulder 23 extending at a distance from the second flange 20, the first sealing element 15 and the inner ring 12 being tightly mounted on the sleeve between a nut 22 and the shoulder 23. This configuration allows making the sealing element 15 and the inner ring 12 remobile relative to the sleeve 19 while guaranteeing their axial positioning on the sleeve 19. The mounting of these components 15, 12 is further easy since it is sufficient to fit them onto the sleeve 19 by putting them in abutment against the shoulder 23 and to block them in position using the nut. The sleeve 19 is further easy to make, for example by machining a thread at a free end of the sleeve 19, the thread being configured to cooperate with threads of complementary shape and pitch of the nut 22, thus allowing the tightening of the components 12, 15 against the shoulder 23 by simply screwing the nut 22.

The shoulder 23 can be monolithic with the sleeve 19. As a variant, the shoulder 23 can be formed by a piece added and fixed onto the sleeve 19, for example a threaded nut screwed onto the sleeve 19, or a mechanically fixed or welded flange. The shoulder 23 extends radially from the sleeve 19. All or part of the components 15, 11, 29 are placed in abutment, directly or indirectly, against the sleeve 19 and blocked in position using the nut 22. The nut applies the components 15, 11, 29 in series against the shoulder 23. The nut 22 and the sleeve 19 can for example comprise complementary threads.

When the first part 16a of the second sealing element is added onto the sleeve 19 (see FIG. 1 for example), this first part 16a is also preferably tightly mounted on the sleeve 19 between the nut 22 and the shoulder 23. Typically, the first part 16a can be positioned axially between the inner ring 12 of the bearing 11 and the shoulder 23.

On the other hand, when the first part 16a of the second sealing element 16 is monolithic with the sleeve 19, the shoulder 23 can be placed either between the inner ring 12 and the first part 16, or between the inner ring 12 and the first sealing element 15. In this case, the inner ring can for example comprise an axial portion 12a which supports the rolling of the bearing 11 and a radial portion 12b which extends from an upstream edge or a downstream edge of the axial portion.

In one embodiment, the shoulder 23 extends at a distance from the second flange 20 and the nut 22 is mounted on the free end of the sleeve 19 extending opposite to the second flange 20 relative to the shoulder 23. The sleeve 19 therefore comprises, from its free end, the nut 22, the first sealing element 15, the bearing 11, the second sealing element 16 and the second flange 20.

The second flange 20 is placed in abutment against the first flange 18 and held in this position, for example using a bolt 21. For this purpose, the first flange 18 and the second flange 20 each comprise at least one orifice, and a fixing member 21 is inserted into these orifices in order to connect the flanges 18, 20. The orifices can be through and smooth orifices, in which case the fixing member 21 can comprise a threaded rod and a nut. As a variant, at least one of the orifices can be threaded, in which case the fixing member 21 can comprise a screw and optionally a nut. Other fixing members can of course be envisaged to connect the first flange 18 and the second flange 20.

The fixing member 21 extends radially outward relative to the sleeve 19. The sleeve 19 is therefore closer to the axis X than the fixing member 21, which contributes to the sealing of the lubrication enclosure.

The components 15, 16, 11, 29 mounted on or formed in the sleeve 19 can comprise at least the inner ring 12 of the bearing 11, the first and second sealing elements 15, 16 and optionally at least one scoop 29. In the illustrated exemplary embodiment, the bearing 11 is placed between the two sealing elements 15, 16, which axially delimit the lubrication enclosure 25. A scoop 29 is further interposed between the first sealing element 15 and the bearing 11. The first sealing element 15, the scoop 29, the bearing 11 and where appropriate the second sealing element 16 are tightly mounted in series between the nut 22 and the shoulder 23 of the sleeve 19. Neither the nut 22, nor the components 11, 15, 16, 29 are therefore fixed, nor even in direct contact, with the low-pressure shaft 8.

Here, the first sealing element 15 comprises a tubular support 15c mounted on the sleeve 19 and a shroud 15a extending upstream from the tubular support 15c and carrying clearance restrictions. The shroud 15a extends radially around the nut 22. The second sealing element 16 further downstream also comprises a support 16c, which is either connected to the sleeve 19 between the shoulder 23 and the inner ring 12 of the bearing 11 (FIG. 1), or monolithic with the sleeve 19, and a shroud 16a extending radially around the sleeve 19 between the support 16c and the second flange 20 and which carries the clearance restrictions.

In one embodiment, the clearance restrictions of the second sealing element 16 comprise a first group of clearance restrictions mounted on the shroud 16a and a second group of clearance restrictions mounted on the part 16b fixed onto the wall 25a of the enclosure. The two groups of clearance restrictions are spaced axially so that the clearance restrictions of the first group face an abradable fixed onto the part 16b while the clearance restrictions of the second group face an abradable fixed onto the shroud 16a. This configuration makes it possible to improve the sealing of the enclosure 25, the axial length of the sealing element 16 being greater due to the presence of the clearance restriction groups and to the space separating them.

In one embodiment, a sum of an axial length of the first sealing element 15 and of the second sealing element 16 is at most equal to twice an axial distance between the nut 22 and the shoulder 23, preferably substantially equal to within 10%.

In order to further improve the sealing of the rotating assembly 10, the assembly 10 further comprises a third sealing element 30 comprising clearance restrictions (knife-edges or twists), the third sealing element 30 comprising a first part 30a added and fixed onto the first flange 18 by being secured in movement to the low-pressure shaft 8 and a second part 30b fixedly mounted relative to the wall 25a of the enclosure 25. Where appropriate, the first part 30a of the third sealing element 30 can be fixed onto the first flange 18 using the fixing member 21, for example between the first and the second flange 18, 20 when the fixing member 21 comprises a bolt. Preferably, the bolt 21 is radially outside relative to the sleeve 19.

Still to improve the sealing of the rotating assembly 10, the third sealing element 30 is outside the enclosure 25, unlike the first and second sealing elements 15, 16 which axially delimit the enclosure 25 and allow the relative rotation of the wall 25a relative to the low-pressure shaft 8. For this, the second part 30b of the third sealing element 30 can be formed by a cylindrical wall extending axially from the wall 25a of the enclosure 25 in the direction of the second flange 20, while the first part 30a is bent and comprises a radial portion mounted on the first flange 18 and an axial portion extending in the direction of the enclosure 25 so as to face the cylindrical wall 30b.

The third sealing element 30 moreover extends radially outward relative to the second sealing element 16.

Where appropriate, the first flange 18 of the low-pressure shaft 8 can be connected to an additional piece 24 of the turbomachine 1, for example to a flange of a rotor (as illustrated in FIG. 1). Where appropriate, the flange 24 extends radially outward relative to the fixing member 21.

The turbomachine 1 can also comprise a lubrication system configured to supply pieces with lubrication fluid, for example the bearing 11. For example, the lubrication system comprises a nozzle 26 opening out into the enclosure 25 and configured to provide an amount of fluid (typically oil) to the bearing 11. In the example illustrated in the figures, the enclosure 25 comprises the bearing 11 and is delimited upstream and downstream by the sealing elements 15 mounted on the sleeve 19. The nozzle 26 can in particular be positioned between the bearing 11 and the most upstream sealing element. The scoop 29 is then mounted on the sleeve 19 so as to extend between the nozzle 26 and the low-pressure shaft 8. It is configured to convey the fluid provided by the nozzle 26 up to the rolling 14 of the bearing 11. For this purpose, the scoop 29 can in particular comprise a sheath fitted onto the sleeve 19 in which are formed an orifice 17 and a supply channel 27 connecting the orifice 17 to the inner ring 12. When the scoop 29 is fixed onto the sleeve 19, the orifice 17 is located in the vicinity of the nozzle 26, for example facing the nozzle 26. The supply channel 27 is preferably formed in the scoop 29 and extends axially from the orifice 17 up to one or several ducts 28 formed in the inner ring 12 and opening out onto the rolling 14. Under the effect of the centrifugal forces, the fluid is then projected by the ducts 28 onto the rolling 14 and diffuses into the enclosure 25.

In one embodiment, the wall 25a of the lubrication enclosure 25 comprises two parts each comprising a fixing flange 31a, 31b. The fixing flanges 31a, 31b of the wall 25a are both fixed onto the same flange 32 of the stator of the turbomachine via a bolt 33. For example, the fixing flanges 31a, 31b can be mounted from on either side of the flange 32 of the stator, the three flanges 31a, 32, 31b being fixed together by the bolt 33. Preferably, each fixing flange 31a, 31b is monolithic with the part of the corresponding wall 25a.

The present disclosure finds a particular application in the case of a turbomachine 1 of the USF type, whose propeller (or fan 2) is unducted and is driven by the low-pressure shaft 8 via a reduction gear 9. The propeller then has a high bypass ratio, typically a bypass ratio greater than 30, for example between 40 and 80. By bypass ratio, it will be understood here the ratio between the flow rate of the secondary stream and the flow rate of the primary stream. The low-pressure shaft 8 of such a turbomachine 1 is then supercritical (that is to say it presents a bending deformation mode in the operating range) and fast. It is therefore subject to a severe vibrational environment. In addition, the materials usually used for these low-pressure shafts 8 can be susceptible to corrosion and wear.

Fixing in particular the sealing elements 15 on the sleeve 19 rather than on the low-pressure shaft 8 thus allows making the sealing elements 15 in materials distinct from the material of the low-pressure shaft 8, and thus reducing the risks of corrosion, in particular at the head of clearance restrictions. The maintenance is further greatly simplified since it is sufficient to dismount the sealing element 15 from the sleeve 19 or possibly the sleeve 19 from the low-pressure shaft 8.

The invention claimed is:

1. An assembly of a turbomachine comprising:
a shaft (8) configured to drive a propeller of the turbomachine about an axis and comprising a first flange extending radially from the shaft, the first flange being monolithic with the shaft;
a sleeve fitted onto the shaft and comprising a second flange extending radially from the sleeve, the sleeve being fixed onto the first flange of the shaft via the second flange;
a lubrication enclosure comprising a wall configured to be fixedly mounted on a stator of the turbomachine;
a bearing housed in the lubrication enclosure, the bearing comprising an inner ring mounted on the sleeve and secured in rotation with respect to the sleeve, and an outer ring configured to be fixedly mounted relative to the wall of the lubrication enclosure;
a first sealing element comprising a first labyrinth seal which has two axially adjacent clearance restrictions, the first sealing element comprising a first part added and fixed onto the sleeve) by being secured in movement with the sleeve and a second part fixedly mounted relative to the wall of the lubrication enclosure;
a second sealing element comprising a second labyrinth seal which has two axially adjacent clearance restrictions, the second sealing element comprising a first part fixedly mounted on the sleeve by being secured in movement to the sleeve and a second part fixedly mounted relative to the wall of the lubrication enclosure, the bearing being placed axially between the first and the second sealing element;
the sleeve further comprising a shoulder extending axially at a distance from the second flange, the first sealing element and the inner ring being tightly mounted axially on the sleeve between a nut and the shoulder.

2. The assembly according to claim 1, wherein the sleeve is made of a material distinct from the material of the shaft.

3. The assembly according to claim 1, wherein the clearance restrictions of at least one of the first and second labyrinth seals comprise at least two knife-edges or a twist that winds on at least two turns.

4. The assembly according to claim 1, further comprising a third sealing element comprising axially adjacent clearance restrictions, the third sealing element comprising a first part added and fixed onto the first flange by being secured in movement to the shaft and a second part fixedly mounted relative to the wall of the lubrication enclosure.

5. The assembly according to claim 4, wherein the third sealing element is disposed radially outside relative to the second sealing element.

6. The assembly according to claim 4, wherein the third sealing element is placed outside the lubrication enclosure.

7. The assembly according to claim 1, wherein the first sealing element and the inner ring are removably mounted on the sleeve.

8. The assembly according to claim 7, further comprising a third sealing element comprising axially adjacent clearance restrictions, the third sealing element comprising a first part added and fixed onto the first flange by being secured in movement to the shaft and a second part fixedly mounted relative to the wall of the lubrication enclosure, wherein one of the second and the third sealing element is also removably mounted on the sleeve.

9. The assembly according to claim 1, wherein the first part of the second sealing element is monolithic with the sleeve.

10. The assembly according to claim 1, wherein the second flange is monolithic with the sleeve.

11. The rotating assembly according to claim 1, wherein the nut is screwed on a free axial end of the sleeve.

12. The assembly according to claim 1, further comprising an additional flange, the additional flange, the second flange and the first flange being connected by a same fixing member.

13. The assembly according to claim 12, wherein the fixing member is a bolt, which is arranged radially outside relative to the sleeve.

14. The assembly according to claim 1, wherein the wall of the lubrication enclosure comprises a third flange and the stator of the turbomachine comprises a fourth flange, the third flange being configured to be fixed onto the fourth flange via a second bolt.

15. The assembly according to claim 14, wherein the wall of the lubrication enclosure comprises two wall portions, a first of the wall portions being monolithic with the third flange and a second of the wall portions being monolithic with a fifth flange, the fifth flange also being fixed onto the fourth flange via the second bolt.

16. The assembly according to claim 15, further comprising an additional flange, the additional flange, the second flange and the first flange being connected by a same fixing member, wherein the fixing member is a bolt, which is arranged radially outside relative to the sleeve, the additional bolt being arranged radially outside the fixing member.

17. The assembly according to claim 1, wherein the two axially adjacent clearance restrictions of the second labyrinth seal comprise a first group of clearance restrictions mounted on the first part and a second group of clearance restrictions mounted on the second part, the first group of clearance restrictions being spaced axially from the second group of clearance restrictions.

18. The assembly according to claim 1, wherein a sum of an axial length of the first sealing element and of the second sealing element is at most equal to a double of an axial distance between the nut and the shoulder.

19. The assembly according to claim 1, wherein the first sealing element comprises a first support fixed onto the sleeve and a first shroud extending radially around the nut, one among the first support and the first shroud having the clearance restrictions of the first labyrinth seal.

20. The assembly according to claim 1, wherein the second sealing element comprises a second support fixedly mounted on the sleeve and a second shroud, the second shroud extending axially between the bearing and the second flange.

21. The assembly according to claim 1, further comprising:
a nozzle opening out into the lubrication enclosure, the nozzle being connected to a lubrication system and being configured to provide an amount of fluid to the bearing; and
a scoop connected to the lubrication system and configured to convey the fluid to the bearing.

22. The assembly according to claim 21, wherein the scoop has an inlet arranged facing the nozzle and an outlet which opens out onto the inner ring.

23. The assembly according to claim 21, wherein the scoop comprises a sheath fitted onto the sleeve in which are formed an orifice and a supply channel fluidly connecting the inlet and the inner ring of the bearing.

24. The assembly according to claim 23, wherein the supply channel extends axially between the inlet and the outlet.

25. A turbomachine comprising the assembly according to claim 1 and an unducted propeller driven in rotation by the shaft, the turbomachine having a bypass ratio greater than 30.

* * * * *